United States Patent [19]

Snashall et al.

[11] Patent Number: 4,979,022
[45] Date of Patent: Dec. 18, 1990

[54] PROCESSING OF COLOR VIDEO SIGNALS

[75] Inventors: Martin G. Snashall, Reading; Mark R. Andrews, Northampton; David F. Levy, Andover, all of United Kingdom

[73] Assignee: Abekas Video Systems Limited, United Kingdom

[21] Appl. No.: 407,265

[22] Filed: Sep. 14, 1989

[30] Foreign Application Priority Data

Sep. 21, 1988 [GB] United Kingdom ............... 8822162.7

[51] Int. Cl.$^5$ ......................... H04N 5/265; H04N 9/75
[52] U.S. Cl. ....................................... 358/22; 358/13; 358/183
[58] Field of Search ............................ 358/13, 22, 183

[56] References Cited

U.S. PATENT DOCUMENTS

| 4,398,209 | 8/1983 | Robitzsch | 358/13 |
| 4,743,960 | 5/1988 | Duvic et al. | 358/13 |
| 4,811,104 | 3/1989 | Kawabe | 358/22 |
| 4,831,447 | 5/1989 | Lake, Jr. | 358/22 |

Primary Examiner—John W. Shepperd
Attorney, Agent, or Firm—Silverman, Cass & Singer, Ltd.

[57] ABSTRACT

A method and apparatus for keying digital color TV signals without exceeding the normal sampling frequency (13.5 MHz) and without obtaining a degraded image. A digital keying signal and a digital color TV signal are supplied to upsamplers (10,12), respectively, which double the sampling frequency of the incoming signal by linear interpolation. The 27 MHz sampled outputs are keyed in multiplier (14). In one line to a switch (24) the 27 MHz, 12 MHz bandwidth keyed signal is passed through low pass filter (16) and demultiplexer (18). The latter removes each alternate sample to provide a 13.5 MHz signal of 6 MHz bandwidth. In a second line to the switch the keyed signal is demultiplexed to provide a signal which would have resulted without upsampling, which is then delayed (22). Edge detector (26) senses high frequency keying signals and controls switch (24). In the absence of such high frequency keying signals the signal to the second line to the switch is taken. Only the presence of high frequency keying is the signal to the first line employed. The invention is thus "transparent" to the viewer in the absence of high frequency keys.

14 Claims, 1 Drawing Sheet

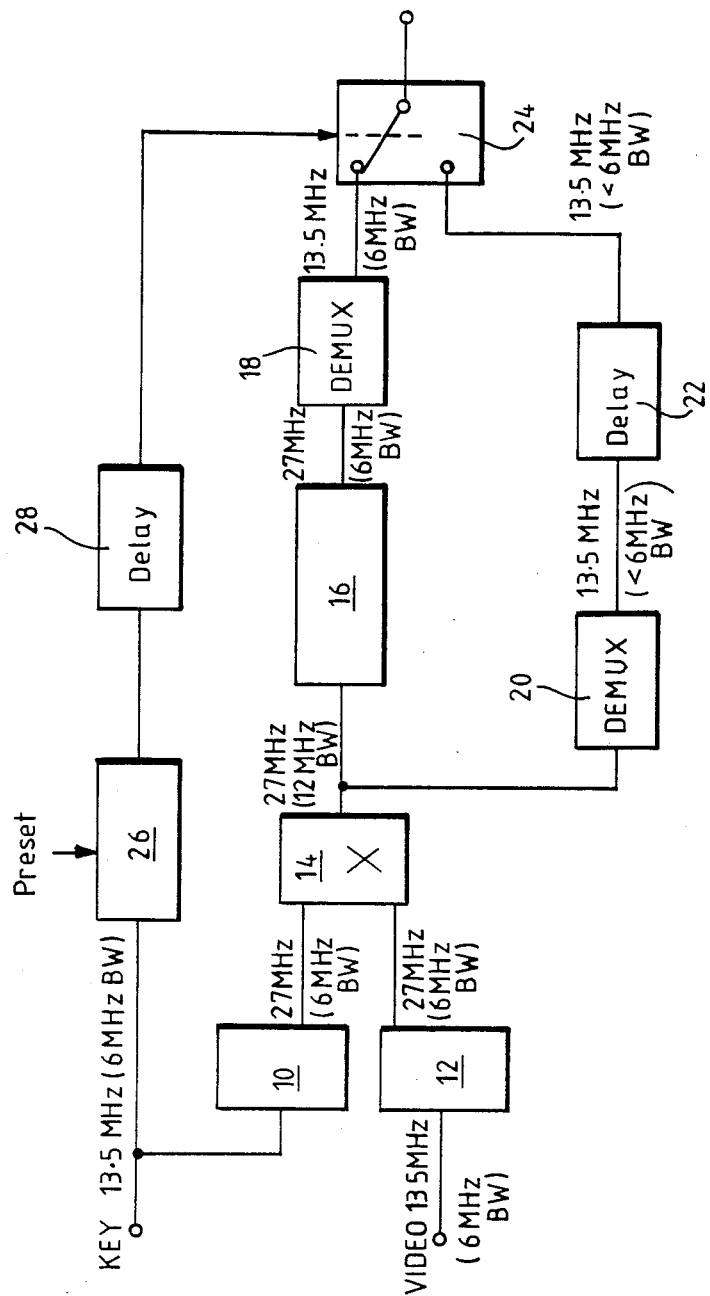

PROCESSING OF COLOR VIDEO SIGNALS

This invention relates to a method and apparatus for processing digital colour video signals, and particularly for keying digital colour TV signals.

A problem with keying digital colour TV signals (the overlaying of different scenes) arises from a frequency limitation. The current normal sampling frequency for a digital colour TV signal is 13.5 MHz, which according to Nyquist sampling theory, limits one to a frequency bandwidth, or resolution, of half this sampling frequency, i.e. just over 6 MHz. As a normal colour TV signal has a bandwidth of about 5 MHz, this is tolerable. However, if one is keying a colour TV signal wherein both the video signal stream and the key signal stream operate at about 5 MHz bandwidths, the bandwidth of the resultant combined or keyed signal is the sum of these two bandwidths, i.e. about 10 MHz. This is no great problem in the analog domain, as this keyed signal may be simply transmitted through a low-pass filter to reduce its bandwidth back to about 5 MHz. In the digital domain, however, the bandwidth of the combined signal (10 MHz) is outside the Nyquist limit for digital sampling at 13.5 MHz (i.e. a limit of about 6 MHz). This results in a degraded image being produced.

The present invention is concerned with a technique for keying a digital colour video signal with a high frequency key so as to reduce image degradation resulting from bandwidths exceeding the Nyquist sampling limit. The invention has the advantage that it only operate in the presence of high frequency key signals. For lower frequency key signals (wherein the combined signal is within the limits on bandwidth) the combined signal is transmitted unaltered and in such circumstance the invention is "transparent" to the user.

According to the present invention there is provided an apparatus for keying a digital colour video signal stream with a digital keying signal, which comprises:

means to receive the digital colour video signal stream and the digital keying signal and for increasing the sampling frequency thereof by interpolating intermediate digital words from the values of at least adjacent digital words in the stream and in the keying signal, respectively;

means for combining the colour video signal stream of increased sampling frequency with the keying signal of increased sampling frequency to provide a keyed signal at said increased sampling frequency and of increased bandwidth;

first means to receive the keyed signal and for reducing the sampling frequency and bandwidth of the keyed signal to that approximating the incoming signal stream;

means for detecting the frequency of the keying signal and for transmitting the output from the reducing means as an output keyed signal only in the event that the detected frequency exceeds a preset limit.

According to the present invention there is also provided a method of keying a digital colour video signal stream with a digital keying signal which comprises:

increasing the sampling frequency of the video signal stream and the keying signal by interpolating intermediate digital words from the values of at least adjacent digital words in the stream and in the keying signal, respectively;

combining the signal stream and keying signal, each of increased sampling frequency, to provide a keyed signal at said increased sampling frequency and at increased bandwidth;

reducing the sampling frequency and the bandwidth of the keyed signal to that approximating the incoming signal stream;

detecting the frequency of the keying signal and transmitting the keyed signal of reduced sampling frequency and bandwidth as an output keyed signal only in the event that the detected frequency exceeds a present limit.

A preferred embodiment of the invention will now be described, by way of example, with reference to the accompanying drawing, which depicts a schematic circuit diagram of an apparatus according to the invention. In the drawing sampling frequencies are given thus: 13.5 MHz, with bandwidths given thus: (6 MHz BW).

Referring to the drawing, the circuit receives a digital keying signal sampled at 13.5 MHz, and a digital colour TV signal also sampled at 13.5 MHz. Both signals are supplied to linear upsamplers 10,12, respectively, the outputs of which are supplied to multiplier 14. The multiplied signal is, on one line, supplied to a low pass filter 16 and a demultiplexer acts as a subsampler by selecting alternate samples on a designated output 18, and on a second line to demultiplexer 20 and delay 22. The outputs from circuits 18 and 22 are applied to electronic switch 24. The keying signal is also supplied to a high frequency edge detector 26, the output of which (after passage through delay 28) controls switch 24 and determines whether the output from demultiplexer 18 or delay 22 is supplied as a keyed output signal from the apparatus.

The circuit operates as follows. Each upsampler (10,12) essentially doubles the sampling frequency of the incoming signal by interpolation between successive digital words. In the present embodiment this is done linearly. If the incoming signal stream is represented by A,B,C,D then the upsampler generates as its output A, $$\frac{A+B}{2}, B, \frac{B+C}{2}, C, \frac{C+D}{2},$$

D. It is important to remember that each alternate sample in the output provided by the upsamplers constitutes the original 13.5 MHz incoming signal. The 27 MHz sampled outputs of the two samplers are then multiplied at 14 so as to provide a keyed video signal of up to about 12 MHz bandwidth. As half the new sampling frequency, 13.5 MHz, is now greater that this additive bandwidth, the signal remains just within the limits of digital resolution. The result of passage of the 27 MHz sampled keyed signal (of about 12 MHz bandwidth) through the low pass filter 16 is to half approximately the bandwidth to about 6 MHz. The demultiplexer 18 then takes out every other digital word so as to reduce the sampling frequency back to 13.5 MHz. The output of the demultiplexer 18 to switch 24 is thus a keyed signal of about 6 MHz bandwidth and a sampling frequency of 13.5 MHz.

The output from multiplier 14 is demultiplexed at 20 so as to remove the alternate interpolated words. Thus, if the video signal had been A,B,C and the key signal X,Y,Z, the output from multiplier 14 is AX, $$\frac{(A+B)}{2} \quad \frac{(X+Y)}{2},$$

BY, $$\frac{(B+C)}{2} \quad \frac{(Y+Z)}{2},$$

CZ. Demultiplexer 20 removes alternate terms to restore AX, BY, CZ—which is the result of keying the original video signal in the absence of unsampling. The output from delay 22 to switch 24 is a 13.5 MHz sampled, 6 MHz bandwidth keyed signal—essentially the result of keying the original video signal without upsampling and consequent low pass filtering.

Edge detector 26 operates so as to cause switch 24 to accept the output from demultiplexer 18 only in the event that it detects a high frequency keying signal. The frequency at which the edge detector triggers may be preset by the user. It is only with such high frequency signals that Nyquist sampling resolution problems arise. If the keying signal is relatively low frequency then no sampling problems arise and it is unnecessary to low pass filter the upsampled keyed signal—the latter is simply restored to its correct value by demultiplexer 20 and passed on by switch 24 unaltered. The result therefore to the user is that the apparatus is transparent—it only makes its presence felt with high frequency key edges which would cause image degradation problems. Averaging each successive digital word so as to double sampling frequency, followed by low pass filtering and demultiplexing provides a better image at high key frequencies than doing nothing and allowing picture degradation to occur.

Although the upsamplers interpolate with a simple averaging between successive digital words, more sophisticated interpolation techniques (known per se) could be employed, e.g. by taking into account any rate of change of signal over more than just each two successive words.

What is claimed is:

1. An apparatus for keying a digital colour video signal stream with a digital keying signal, which comprises:
    means to receive the digital colour video signal stream and the digital keying signal and for increasing the sampling frequency thereof by interpolating intermediate digital words from the values of at least adjacent digital words in the stream and in the keying signal, respectively;
    means for combining the colour video signal stream of increased sampling frequency with the keying signal of increased sampling frequency to provide a keyed signal at said increased sampling frequency and of increased bandwidth;
    first means to receive the keyed signal and for reducing the sampling frequency and bandwidth of the keyed signal to that approximating the incoming signal stream;
    means for detecting the frequency of the keying signal and for transmitting the output from the reducing means as an output keyed signal only in the event that the detected frequency exceeds a preset limit.

2. An apparatus according to claim 1 wherein said means for reducing includes low pass filter means for reducing the bandwidth of the keyed signal to that approximately the bandwidth of the incoming signal stream.

3. An apparatus according to claim 2 wherein said means for reducing includes demultiplexing means for recucing the sampling frequency of the keyed signal to that of the incoming signal stream.

4. An apparatus according to claim 2 wherein said means for increasing the sampling frequency comprises means for doubling the sampling frequency.

5. An apparatus according to claim 1 wherein said means for reducing includes demultiplexing means for reducing the sampling frequency of the keyed signal to that of the incoming signal stream.

6. An apparatus according to claim 5 wherein said means for increasing the sampling frequency comprises means for doubling the sampling frequency.

7. An apparatus according to claim 1 wherein said means for increasing the sampling frequency comprises means for doubling the sampling frequency.

8. An apparatus according to claim 7 wherein said means for doubling the sampling frequency comprises means for interpolating each intermediate digital word by taking the average of values adjacent digital words in the stream and in the keying signal, respectively.

9. An apparatus according to claim 1 which additionally comprises second means to receive the keyed signal from the combining means and for reducing the sampling frequency to that of the incoming signal stream without reducing bandwidth, and switch means, responsive to the output of the means for detecting, for selecting either the output of the first means or the second means as the output keyed signal.

10. An apparatus according to claim 1 wherein said means for detecting comprises edge detecting means for detecting high frequency key signals and means for preselecting the detection level.

11. A method of keying a digital colour video signal stream with a digital keying signal which comprises:
    increasing the sampling frequency of the video signal stream and the keying signal by interpolating intermediate digital words from the values of at least adjacent digital words in the stream and in the keying signal, respectively;
    combining the signal stream and keying signal, each of increased sampling frequency, to provide a keyed signal at said increased sampling frequency and at increased bandwidth;
    reducing the sampling frequency and the bandwidth of the keyed signal to that approximating the incoming signal stream;
    detecting the frequency of the keying signal and transmitting the keyed signal of reduced sampling frequency and bandwidth as an output keyed signal only in the event that the detected frequency exceeds a present limit.

12. A method according to claim 11 which comprises, in said increasing step, doubling the sampling frequency by taking the average of values of adjacent digital words as the intermediate interpolated words.

13. A method according to claim 12 which comprises additionally reducing the sampling frequency of the keyed signal, but not the bandwidth, and, in response to said frequency detecting, transmitting said keyed signal of reduced sampling frequency and reduced bandwidth above a preset detected frequency and transmitting said keyed signal of reduced sampling frequency and unreduced bandwidth below said present detected frequency.

14. A method according to claim 11 which comprises additionally reducing the sampling frequency of the keyed signal, but not the bandwidth, and, in response to said frequency detecting, transmitting said keyed signal of reduced sampling frequency and reduced bandwidth above a preset detected frequency and transmitting said keyed signal of reduced sampling frequency and unreduced bandwidth below said present detected frequency.

* * * * *